United States Patent Office 3,179,490
Patented Apr. 20, 1965

3,179,490
PREPARATION OF MAGNESIUM
ALUMINUM HYDRIDE
Donald F. Musinski, Bay City, Mich., and James E. Krueger, New City, N.Y., assignors to The Dow Chemical Company, Midland, Mich., a corporation of Delaware
No Drawing. Filed June 27, 1962, Ser. No. 207,148
1 Claim. (Cl. 23—14)

This invention pertains to an improved process for the preparation of magnesium aluminum hydride.

While magnesium aluminum hydride has been reported in the literature, heretofore this particular compound has not been isolated from solution containing reaction products. The preparation of magnesium aluminum hydride which has been suggested involves the reaction of lithium aluminum hydride with magnesium halide in an ether medium. When the above process is used, a solvated product is obtained containing magnesium aluminum hydride as well as from 10 to about 20 percent chlorine. The product could not be desolvated or freed of its chlorine content.

It is, therefore, an object of this invention to provide an improved process for the preparation of magnesium aluminum hydride. A further object is to provide a process for the preparation of magnesium aluminum hydride from which the magnesium aluminum hydride may be separated and recovered.

The above and other objects are attained according to this invention by reacting sodium aluminum hydride with magnesium chloride in a substantially anhydrous liquid organic media such as tetrahydrofuran, tetrahydropyran or 1,2-dimethoxyethane. In carrying out the reaction of magnesium chloride with sodium aluminum hydride, a reaction mixture containing magnesium aluminum hydride solvated with the solvent is obtained. The product thus obtained is contacted with a selective solvent, such as additional amounts of reaction medium or an alkyl ether to dissolve or separate the magnesium aluminum hydride solvate from the sodium chloride formed by the reaction. The solvated magnesium aluminum hydride product freed of the other constituents is subjected in its solid or crystalline form to heat treatment at a temperaure of 55° to 120° C. under reduced pressure to desolvate the product to form magnesium aluminum hydride. By the above process the final product obtained contains over 90 percent magnesium aluminum hydride without further purification.

In carrying out the reaction, generally, approximately stoichiometric amounts of the reactants are used. However, a slight excess of one of the reactants may be used if it is desirable to insure that substantially all of the other reactant is reacted. Preferably, a solution of magnesium chloride in the solvent is used into which the sodium aluminum hydride is slurried. While the reaction may be carried out at room temperature, it is usually preferred to heat the mixture to a temperature in the range of 50° to 80° C. to increase the rate of reaction. Temperatures as high as 120° C. may be used. Above 120° C. the reaction is operative. However, generally the reaction media show some reactivity with the reactants or product. Atmospheric pressure is usually used for the reaction except when higher reaction temperatures may be desired which may require using higher pressures with the low boiling solvents. Substantial conversion of the sodium aluminum hydride to magnesium aluminum hydride is obtained in a reaction time of 1 to 2 hours. However, generally it is preferred to use a reaction time in the range of 4 to 24 hours especially at the lower reaction temperatures.

In the employment of tetrahydrofuran, tetrahydropyran, or 1,2-dimethoxyethane as a solvent for the reaction medium, a solvated magnesium aluminum hydride is obtained. This product is only partially soluble in the reaction media. Thus, as a result, the product as soon as formed precipitates out. Sodium chloride which is also formed as a result of the reaction likewise precipitates out. The solvated magnesium aluminum hydride and the sodium chloride become intermixed. Thus, the solvated magnesium aluminum hydride is obtained from the reaction mixture as a solid intermixed with sodium chloride.

Any of the various known processes for separating different salts such as fractional crystallization and extraction may be used to separate the solvated magnesium aluminum hydride from the other constituents. Conveniently, the solvated magnesium aluminum hydride may be separated by use of selective solvents. While a solvent in which the solvated magnesium aluminum hydride is not soluble but the other constituents are soluble may be used to remove the other constituents, it is more convenient to use a solvent in which the solvated magnesium aluminum hydride is soluble and the other constituents are not. Since the solvated magnesium aluminum hydride is partially soluble in the reaction media, additional amounts of the reaction media may be used to extract the solvated product. In addition to the reaction diluents, alkyl ethers, such as diethyl ether, may also be used. Diethyl ether is preferred. The solubility of the solvated magnesium aluminum hydride in diethyl ether and other of the solvents is considerably greater than for the other constituents so that substantially all of the solvated product may be extracted from the other constituents. In addition, it may be further purified by fractional crystallization, if desired.

Generally, after the reaction of the magnesium chloride with the sodium aluminum hydride, the precipitated product obtained is recovered from the reaction mixture by settling or filtration. The solid product obtained is then contacted with the selective solvent, preferably diethyl ether, at a temperature in the range of 50° to 80° C. to dissolve the solvated magnesium aluminum hydride. The solvated magnesium aluminum hydride is recovered from the selective solvent by vaporizing substantially all of the solvent at reduced pressures to crystallize out the solvated product.

After substantially all of the solvent has been removed from the solvated product, the solvated solid product is subjected to a temperature in the range of 55° to 120° C. to remove all of the solvent and also to desolvate the product. A temperature in the range of 80° to 95° C. is generally preferred for the desolvation step. While desolvated or unsolvated magnesium aluminum hydride is relatively stable up to temperatures of 125° C., the solvated material begins to decompose at temperatures of 95° C. Thus, in the desolvation step, especially at the beginning of the desolvation step, temperatures below 95° C. are generally used. However, after a major portion of the solvated material has been converted to magnesium aluminum hydride, higher temperatures may be used and the product may be heated up to 120° C. for a short time to assure complete desolvation and evaporation of any solvent which may remain. Usually the desolvating or heat treatment step is carried out at a reduced pressure from less than 1 to 10 mm. of Hg absolute, to shorten the time required for the desolvating step, although a reduced pressure does not have to be necessarily used.

An alternate method may be used for recovering the solvated magnesium aluminum hydride from the solution prior to the heat treatment step to desolvate the product. After the solution containing the solvated magnesium aluminum hydride is concentrated and instead of vaporizing the solvent to crystallize the solvated magnesium aluminum hydride, an inert hydrocarbon material in which the solvated product is insoluble is added to the solvated magnesium aluminum hydride solution to complete the precipitation of the solvated product. Appropriate hydrocarbon materials include, for example, pentane, hexane, and the like as well as xylene, toluene and other aromatic type solvents. The precipitate thus obtained may be then recovered from the mixture and heat treated in a manner similar to that described above. An advantage of using the hydrocarbon material is that the solvated magnesium aluminum hydride precipitates out as a finely divided crystalline material.

The following examples further illustrate the invention.

*Example I*

A solution containing 12.1 grams of magnesium chloride in 300 milliliters of tetrahydrofuran was added to a slurry of 16.9 grams of sodium aluminum hydride in 200 milliliters of tetrahydrofuran. The mixture was heated under reflux for 17 hours after which approximately 400 milliliters of the tetrahydrofuran was distilled off under atmospheric pressure. The remaining reaction mixture was filtered and the cake obtained was extracted with diethyl ether in a Soxhlet-type extractor. The ether extract thus obtained was evaporated to dryness to give 9.09 grams of solid which analyzed 49 percent magnesium aluminum hydride. This product was washed with tetrahydrofuran after which it was heated at about 57° C. at $10^{-4}$ millimeters mercury pressure to give 2.5 grams of slightly gray finely divided solid material. The material was found to contain 93 percent magnesium aluminum hydride, 3 percent tetrahydrofuran, about 0.3 percent sodium chloride, and the balance aluminum metal and magnesium hydride.

*Example II*

A solution of 28.8 grams of anhydrous magnesium chloride in 1 liter of anhydrous tetrahydrofuran was slowly added to a slurry of 33.8 grams of sodium aluminum hydride in 200 milliliters of tetrahydrofuran. The mixture was heated under reflux for 20 hours and then concentrated to approximately 200 milliliters by distilling off the tetrahydrofuran. To the concentrated 200 milliliters of reaction mixture, approximately 500 milliliters of pentane was added. The precipitate obtained was recovered by filtration and subjected to extraction with tetrahydrofuran in a Soxhlet-type apparatus. The resulting solution obtained was then evaporated to obtain a white crystalline solid which upon analysis was found to contain approximately 60 percent tetrahydrofuran. This crystalline material was heated at about 95° C. at $10^{-4}$ millimeters of mercury pressure absolute for about 24 hours. The resulting 8.6 grams of solid was analyzed and found to contain 85.8 weight percent of magnesium aluminum hydride with the majority of the remainder being magnesium hydride and aluminum metal.

*Comparison example*

To illustrate the results obtained when a metal aluminum hydride other than sodium aluminum hydride is used, the reaction described above was carried out in a similar manner except that lithium aluminum hydride was used in place of the sodium aluminum hydride. A solution of about 4.75 grams of anhydrous magnesium chloride in 103 ml. of anhydrous tetrahydrofuran was slowly added to a slurry containing about 3.8 grams of lithium aluminum hydride in 150 milliliters of tetrahydrofuran.

The resulting mixture was refluxed at about 67° C. for about 20 hours after which time the volume of the reaction mixture was reduced to approximately 75 milliliters by distilling tetrahydrofuran therefrom and the residual solution then was filtered to remove a small amount of impurities.

The remainder of the tetrahydrofuran reaction media was removed from the product mixture by evaporation under reduced pressure. The solid residue was dried at about 55° C. and at a pressure of about $1 \times 10^{-4}$ millimeters mercury absolute for about 23 hours.

Elemental analysis of the resulting mixture indicated that only about 2% hydridic hydrogen was present in the product. The presence of this relatively small amount of hydridic hydrogen indicated the magnesium aluminum hydride product was present as a solvated material. X-ray diffraction indicated the presence of substantial quantities of lithium chloride. An analysis showing fairly large amounts of carbon, substantiated the presence of tetrahydrofuran in the final product.

A comparison of the magnesium aluminum hydride produced by the process of the present invention and the product of the prior art may be made as follows:

|  | Product of Present Invention | Product of Prior Art |
| --- | --- | --- |
| Percent Hydridic Hydrogen. | 7.5-9.2 | Less than 2.5. |
| Stability. | At least years at room temperature. | Unstable at room temperature. |
| Solubility in Tetrahydrofuran. | Relatively insoluble. | Relatively soluble. |
| Decomposition temperature. | Above 115° C | About 70° C. |

Magnesium aluminum hydride which is substantially pure, non-solvated and contains at least 7.5 percent hydridic hydrogen are useful as a component of a rocket propellant grain to replace aluminum.

Various modifications may be made in the present invention without departing from the spirit or scope thereof, for it is to be understood that we limit ourselves only as defined in the appended claim.

What is claimed is:

A process for the preparation of magnesium aluminum hydride, which comprises intermixing sodium aluminum hydride with magnesium chloride in a reaction media selected from the group consisting of tetrahydrofuran, tetrahydropyran, and 1,2-dimethoxyethane to thereby react the sodium aluminum hydride with magnesium chloride to obtain a precipitate of magnesium aluminum hydride solvated with the reaction media and sodium chloride, separating the precipitate from the reaction mixture, contacting the precipitate with a selective solvent, said solvent being a member selected from the group consisting of the members of said reaction medium and alkyl ethers, thereby to separate the solvated magnesium aluminum hydride from the remaining constituents in the precipitate, recovering the separated solvated magnesium aluminum hydride in its crystalline form, heating the crystalline solvated magnesium aluminum hydride to a temperature in the range of 55° to 120° C. to desolvate the solvated magnesium aluminum hydride.

References Cited by the Examiner

UNITED STATES PATENTS 2,567,972　9/51　Schlesinger _____ 23—14
2,920,935　1/60　Finholt _____ 23—14

OTHER REFERENCES

Hurd: Chemistry of Hydrides (1952), page 168.

MAURICE A. BRINDISI, *Primary Examiner.*

CARL D. QUARFORTH, *Examiner.*